(12) United States Patent
Watanabe et al.

(10) Patent No.: US 11,874,225 B2
(45) Date of Patent: Jan. 16, 2024

(54) MEASUREMENT DEVICE, MEASUREMENT SYSTEM, MEASUREMENT PROGRAM, AND MEASUREMENT METHOD

(71) Applicant: THE UNIVERSITY OF TOKYO, Tokyo (JP)

(72) Inventors: Yoshihiro Watanabe, Tokyo (JP); Masatoshi Ishikawa, Tokyo (JP); Konosuke Kachi, Tokyo (JP)

(73) Assignee: THE UNIVERSITY OF TOKYO

( * ) Notice: Subject to any disclaimer, the term of this patent is extended or adjusted under 35 U.S.C. 154(b) by 485 days.

(21) Appl. No.: 17/261,680

(22) PCT Filed: Jul. 26, 2019

(86) PCT No.: PCT/JP2019/029375
§ 371 (c)(1),
(2) Date: Jan. 20, 2021

(87) PCT Pub. No.: WO2020/022473
PCT Pub. Date: Jan. 30, 2020

(65) Prior Publication Data
US 2021/0262934 A1  Aug. 26, 2021

(30) Foreign Application Priority Data

Jul. 26, 2018 (JP) ................. 2018-140773

(51) Int. Cl.
*G01N 21/57* (2006.01)
*G01N 21/47* (2006.01)

(52) U.S. Cl.
CPC ............ *G01N 21/57* (2013.01); *G01N 21/47* (2013.01); *G01N 2021/4711* (2013.01); *G01N 2021/4735* (2013.01)

(58) Field of Classification Search
CPC ... G01N 2021/4711; G01N 2021/4735; G01N 2021/555; G01N 21/47; G01N 21/55; G01N 21/57; G01N 2201/1296
See application file for complete search history.

(56) References Cited

U.S. PATENT DOCUMENTS 4,704,121 A   11/1987  Moise
5,590,251 A   12/1996  Takagi
(Continued)

FOREIGN PATENT DOCUMENTS

CN   106104261 A   11/2016
EP       157859 B1   4/1992
(Continued)

OTHER PUBLICATIONS

Foo, Sing Choong et al."A gonioreflectometer for measuring the bidirectional reflectance of material for use in illumination computation", Aug. 1997 pp. 1-145 (in English).
(Continued)

*Primary Examiner* — Tarifur R Chowdhury
*Assistant Examiner* — Amanda Merlino
(74) *Attorney, Agent, or Firm* — Harness, Dickey & Pierce, P.L.C.

(57) ABSTRACT

A reflection characteristic measurement device is provided that comprises: a control unit configured to measure a reflection characteristic of an object based on target information and instruction information, wherein: the target information is information including a coordinate positional relationship among a light source position of an incident light, a light detection position of a reflected light and a measurement point at the object, and numerical values related to the incident light and the reflected light, the incident light is light irradiated to the measurement point, the reflected light is light that the incident light is irradiated
(Continued)

to the measurement point and then reflected at the measurement point, the instruction information is information related to an existing measurement result of the reflection characteristic, and the number of combinations of the coordinate positional relationship included in the target information is 1 to 15.

20 Claims, 12 Drawing Sheets

(56) References Cited

U.S. PATENT DOCUMENTS

| | | | |
|---|---|---|---|
| 2015/0219557 | A1 | 8/2015 | Skaff et al. |
| 2016/0040985 | A1 | 2/2016 | Nagai et al. |
| 2017/0016832 | A1 | 1/2017 | Umemura et al. |
| 2018/0253869 | A1* | 9/2018 | Yumer .................. G06T 11/60 |

FOREIGN PATENT DOCUMENTS

| | | | |
|---|---|---|---|
| EP | 637731 | A1 | 2/1995 |
| EP | 822396 | A1 | 2/1998 |
| EP | 2988112 | A1 | 2/2016 |
| EP | 3112849 | A1 | 1/2017 |
| JP | S61-500058 | A | 1/1986 |
| JP | H04-072551 | A | 3/1992 |
| JP | H07-077416 | A | 3/1995 |
| JP | H0777416 | A * | 3/1995 ......... G03G 15/2017 |
| JP | H07-150081 | A | 6/1995 |
| JP | 2007-232652 | A | 9/2007 |
| JP | 2014-228300 | A | 12/2014 |
| JP | 2016-038222 | A | 3/2016 |
| JP | 2016-091359 | A | 5/2016 |
| WO | 1985-001436 | A1 | 4/1985 |
| WO | 2014-189059 | A1 | 11/2014 |
| WO | 2015-133287 | A1 | 9/2015 |

OTHER PUBLICATIONS

Miyashita, leo et al. "Rapid BRDF Measurement for Digital Archive of Books", Dec. 6, 2012, IS2-D1, Technical Committee on Industrial Apprication of Image Processing pp. 1-10 (with English Abstract).

Nitta, Masashi et al. "Adaptive BRDF Sampling Method Based on Between-model Variance", Jan. 11, 2018, vol. 117, No. 391, PRMU2017-139, ISSN:2432-6380, the Institute of Electronics, Information and Communication Engineers p. 251—(with English Abstract).

Watanabe, Yoshihiro et al. "Minimal Sampling Design using Bayesian Optimization Toward High-speed BRDF Acquisition", Jan. 11, 2018, vol. 117, No. 391, PRMU2017-138, ISSN:2432-6380, the Institute of Electronics, Information and Communication Engineers, pp. 245-250 (with English Abstract).

Iwanaga, Tomoki et al. "SVBRDF Acquisition Using Non-negative Matrix Factorization", Jan. 11, 2018, vol. 117, No. 391, PRMU2017-121, ISSN:3432-6380, the Institute of Electronics, Information and Communication Engineers, pp. 81-86 (with English Abstract).

International Search Report (English and Japanese) of the International Searching Authority issued in PCT/JP2019/029375, dated Oct. 29, 2019; ISA/JP (5 pages).

J B Nielsen et al.; "On Optimal, Minimal BRDF Sampling for Reflectance Acquisition"; ACM Transactions on Graphics; vol. 34, No. 6, Article 186; Published on Nov. 2015 (total 11 pages).

Ye Yu and William A. P. Smith; "PVNN: A neural network library for photometric vision"; 2017 IEEE International Conference on Computer Vision Workshops; Department of Computer Scinece, University of York, U.K.; pp. 526-535; IEEE, Oct. 22, 2017 (total 10 pages).

Supplementary European Search Report issued for the corresponding European Patent Application No. EP19840527.6; dated Feb. 9, 2022 (total 12 pages).

* cited by examiner

FIG. 6A  MEASUREMENT RESULT
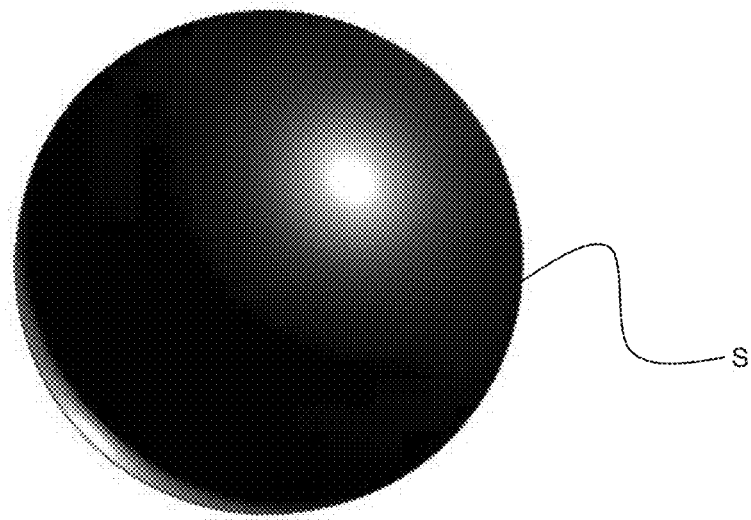
FIG. 6B  TRUE VALUE
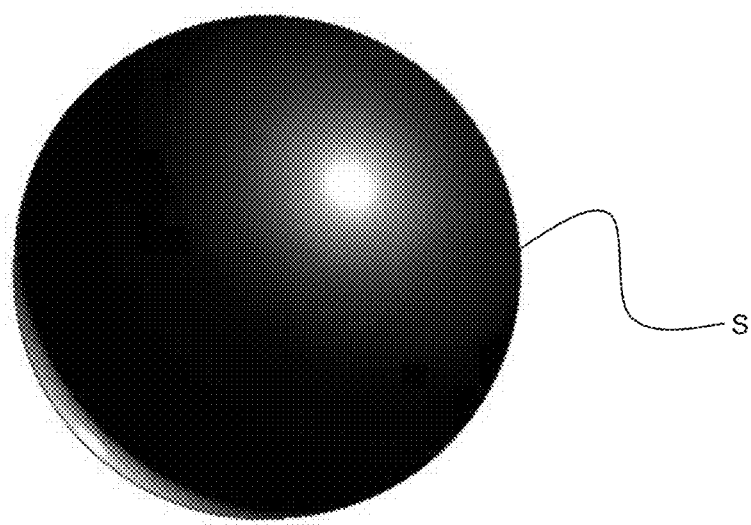

FIG. 8A MEASUREMENT RESULT
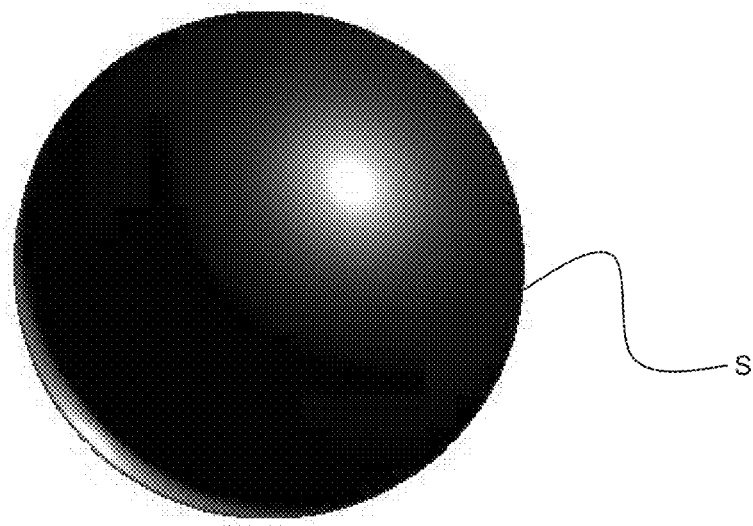
FIG. 8B TRUE VALUE
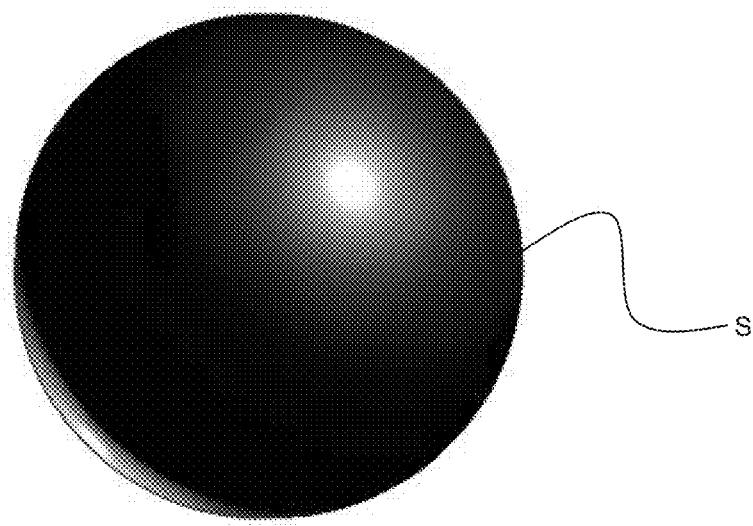

FIG. 11A  FOR WHITE (ACHROMATIC COLOR)
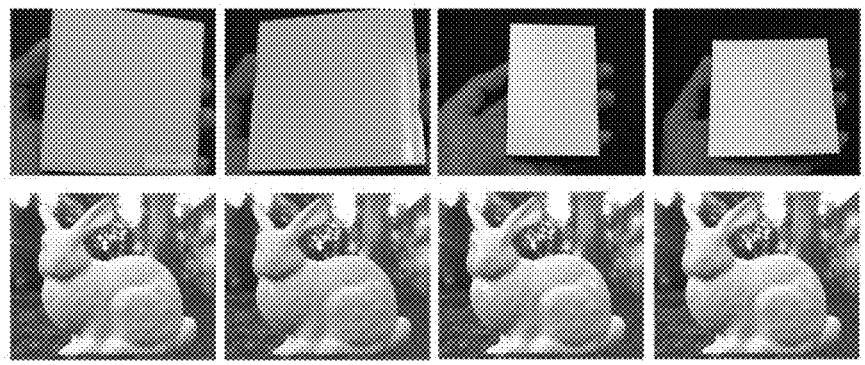
FIG. 11B  FOR BOTH WHITE AND NON-WHITE (ACHROMATIC COLOR)
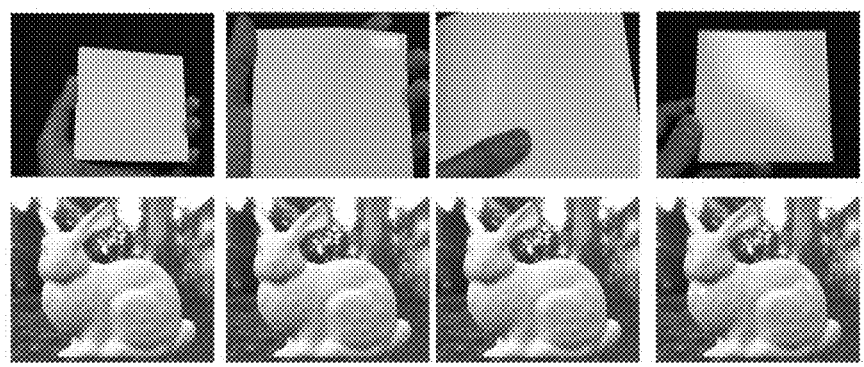
FIG. 11C  FOR NON-WHITE (ACHROMATIC COLOR)
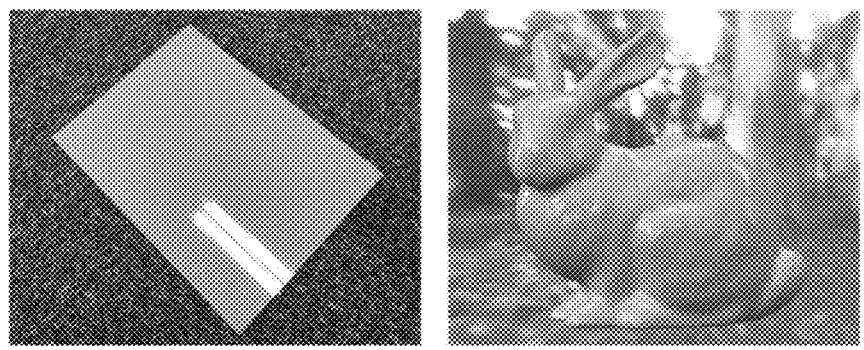

FIG. 12 FOR CHROMATIC COLOR
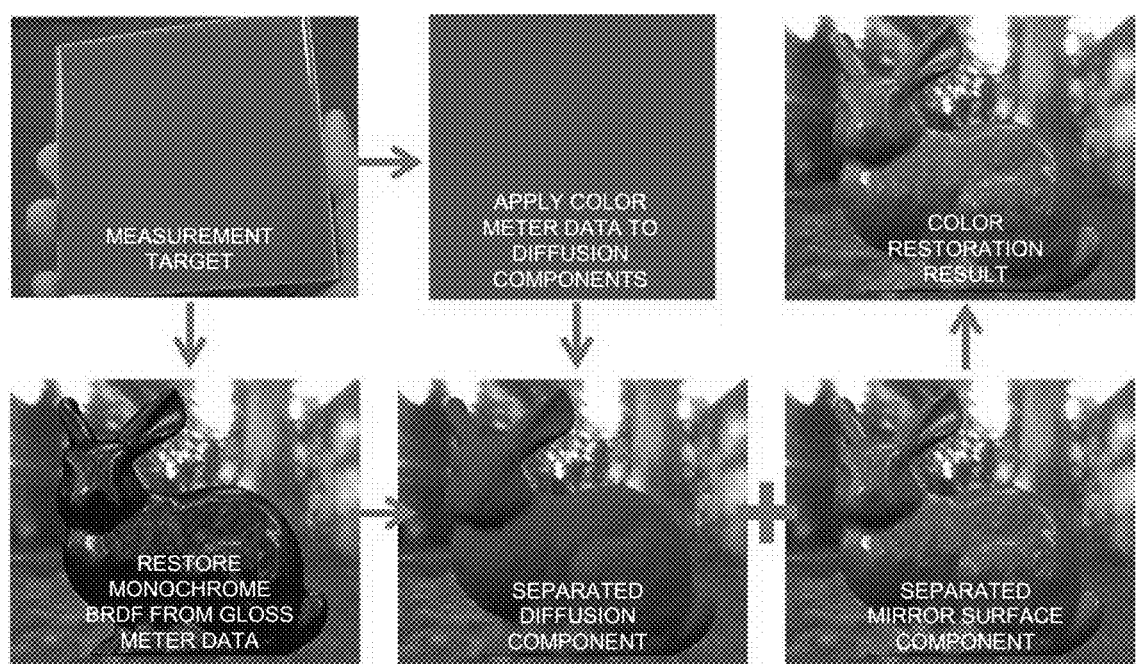

MEASUREMENT DEVICE, MEASUREMENT SYSTEM, MEASUREMENT PROGRAM, AND MEASUREMENT METHOD

CROSS REFERENCE TO RELATED APPLICATIONS

This is a U.S. National Phase application of International Application No. PCT/JP2019/029375, filed on Jul. 26, 2019, which claims priority to Japanese Patent Application No. 2018-140773, filed on Jul. 26, 2018. The entire disclosures of the above applications are expressly incorporated by reference herein.

BACKGROUND

Technical Field

The present invention relates to a reflection characteristic measurement device, a measurement system, a measurement program, and a measurement method.

Related Art

The "reflection characteristic" is important as an element constituting the visual texture of an object. The reflection characteristic plays an important role in fields such as digital archiving and quality control. When measurement the reflection characteristic, sampling is performed by irradiating incident light to the object and detecting the reflected light. The reflection characteristic is expressed as a function, and the function is estimated from the value sampled in the space formed by the variable. For example, Sing Choong Foo, "A genioreflectometer for measuring the spherical reflectance of material for use in illumination", 1997 discloses a goniometer capable of measuring a reflection characteristic. The goniometer is a measurement device including a light source, a light detection unit, and the like, and is general in that a value in an arbitrary sampling direction can be measured.

However, when measurement the reflection characteristic by using a measurement device such as a goniometer, it is necessary to sampling the incident light/reflected light from a huge number of directions. For example, although the isotropic bidirectional reflectance distribution function (BRDF), which is relatively simple among the reflection characteristics, has an angular parameter with three degrees of freedom, if sampled at every one degree with respect to each parameter, the number of samples will be enormous as 90×90×180=1,458,000, and the lengthening of the measurement time becomes a problem. Therefore, it can be said that it is required to further shorten the time required for measurement the reflection characteristic.

SUMMARY

The present invention has been made in view of the above circumstances and provides a measurement device, a measurement system, a measurement program, and a measurement method capable of measuring the reflection characteristic of a desired object with a small number of samplings at high speed and high accuracy.

According to an embodiment of the present invention, there is provided a reflection characteristic measurement device comprising a control unit configured to measure a reflection characteristic of an object based on target information and instruction information, wherein: the target information is information including a coordinate positional relationship among a light source position of an incident light, a light detection position of a reflected light and a measurement point at the object, and numerical values related to the incident light and the reflected light, the incident light is light irradiated to the measurement point, the reflected light is light that the incident light is irradiated to the measurement point and then reflected at the measurement point, the instruction information is information related to an existing measurement result of the reflection characteristic, and the number of combinations of the coordinate positional relationship included in the target information is 1 to 15.

The measurement device according to the present invention can measure a reflection characteristic of an object based on information (target information) including a coordinate positional relationship (sampling direction) between a light source position, a light detection position and a measurement point, and numerical values (sampling values) related to incident light and reflected light, and information (instruction information) related to an existing measurement result of the reflection characteristic. In particular, it should be noted that the number of combinations (sampling number) of the coordinate positional relationship included in the target information is 1 to 15. According to the measurement device having such a configuration, to measure a desired reflection characteristic in a very short time can be achieved.

BRIEF DESCRIPTION OF THE DRAWINGS

FIG. 6A is a diagram showing a measurement result of a reflection characteristic when shown in FIG. 5, and FIG. 6B is a diagram showing a true value of the reflection characteristic when shown in FIG. 5.

FIG. 8A is a diagram showing a measurement result of a reflection characteristic when shown in FIG. 7, and FIG. 8B is a diagram showing a true value of the reflection characteristic when shown in FIG. 7.

FIG. 11A is an example in which the glossiness of an object (white/achromatic color) is measured, a Full BRDF is estimated, and this is output as computer graphics (Stanford bunny) of a different object, FIG. 11B is an example of measurement the glossiness of an object (when both white and non-white include achromatic colors), estimating the Full BRDF, and outputting this as computer graphics (Stanford bunny) of different objects, and FIG. 11C is an example in which the glossiness of an object (non-white/achromatic color) is measured to estimate the Full BRDF, and this is output as computer graphics (Stanford bunny) of a different object.

FIG. 12 is an example in which the glossiness of an object (chromatic color) is measured, a Full BRDF is estimated, and this is output as computer graphics (Stanford bunny) of a different object including color information.

DETAILED DESCRIPTION

Hereinafter, embodiments of the present invention will be described with reference to the drawings. Various features described in the embodiment below can be combined with each other. Especially in the present specification, the "unit" may include, for instance, a combination of hardware resources implemented by circuits in a broad sense and information processing of software that can be concretely realized by these hardware resources. Further, although various information is performed in the present embodiments, these information are represented by high and low signal values as a bit set of binary numbers composed of 0 or 1, and communication/calculation can be executed on a circuit in a broad sense.

Further, a circuit in a broad sense is a circuit realized by at least appropriately combining a circuit, a circuitry, a processor, a memory, and the like. That is, an application special integrated circuit (ASIC), a programmable logic device (for example, a simple programmable logic device (SPLD)), a complex programmable logic device (CLPD), a field programmable gate array (FPGA), and the like.

1. Overall Configuration

Figure 1:
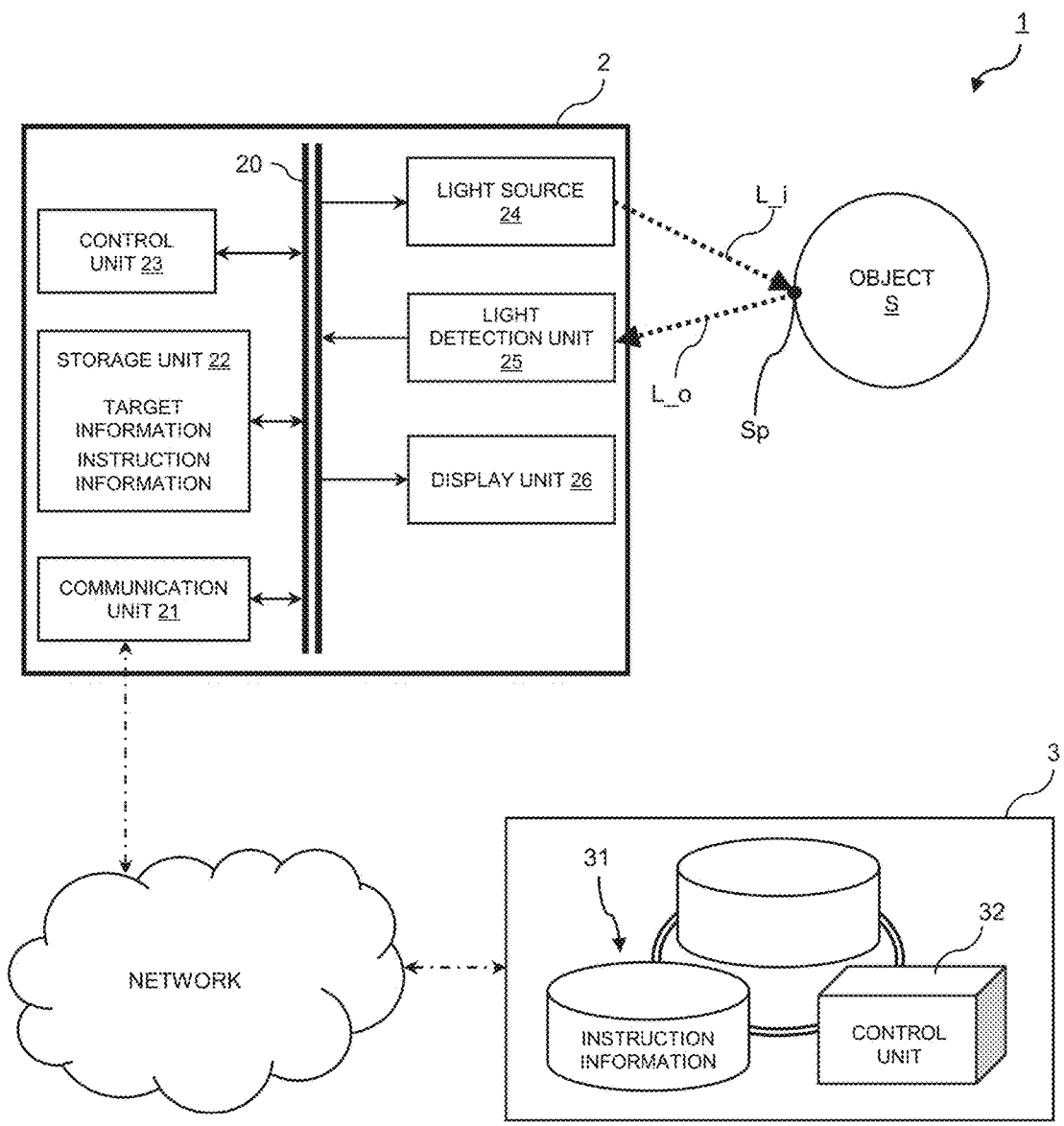
FIG. 1 is a schematic configuration diagram of a measurement system according to the present embodiment.

FIG. 1 is a schematic configuration diagram of a measurement system 1 according to the present embodiment. The measurement system 1 is configured to measure a reflection characteristic of an object S. As shown in FIG. 1, the measurement system 1 includes a measurement device 2 and an information processing device 3, both of which are connected to each other via a network. In Sections 1.1 to 1.2, the measurement device 2 and the information processing device 3 will be described respectively.

1.1 Measurement Device 2

The measurement device 2 includes a communication unit 21, a storage unit 22, a control unit 23, a light source 24, a light detection unit 25, and a display unit 26, and these components electrically communicate with each other in the measurement device 2 via a communication bus 20. Hereinafter, each component will be further described.

<Communication Unit 21>

Although wired communication means such as USB, IEEE1394, Thunderbolt, or wired LAN network communication are preferable, the communication unit 21 may also include wireless LAN network communication, mobile communication such as LTE/3G, Bluetooth (registered trademark) communication and the like as necessary. That is, it is more preferable to carry out as a set of these plurality of communication means. Further, the reflection characteristic may be measured while communicating with the information processing device 3 described later, which is an external device, via the communication unit 21, or may be independently operated in an offline environment. Further, the measured reflection characteristic may be transmitted to the information processing apparatus 3.

<Storage Unit 22>

The storage unit 22 (an example of a "storage medium" in the claims) stores the information defined by the above description. For example, the storage unit 22 stores target information, instruction information, various programs for the control unit 23 to execute, and the like. This is, for example, as a storage device such as a solid state drive (SSD), or as a random access memory (RAM) that stores temporarily necessary information (arguments, arrays, etc.) related to program operations. Moreover, combinations thereof may be used.

The target information is sampling data required for measuring the reflection characteristic of the object S and is determined by a coordinate positional relationship among the light source 24 (incident light), the light detection unit 25 (reflected light) and the measurement point Sp which is a part of the object S, which will be described later, and numerical values (radiant intensity, etc.) related to the incident light and the reflected light. Further, the instruction information is information related to an existing measurement result of the reflection characteristic, and is instruction data employed in the estimation of the reflection characteristic by using machine learning described later. In general, the instruction information may be, for example, information including various parameters machine-learned based on known measurement results, and may be information including the measurement results themselves. The instruction information may be stored in the storage unit 22 in advance when implementing the measurement device 2, but the updated data of the instruction information may be downloaded from the information processing device 3 via the communication unit 21 and may be configured to be memorable if necessary. Furthermore, the updated data of the instruction information to be downloaded may be all or a part of the instruction data stored in the information processing device 3.

<Control Unit 23>

The control unit 23 processes and controls the overall operation related to the measurement device 2. The control unit 23 is, for example, a central processing unit (CPU) (not shown). The control unit 23 realizes various functions related to the measurement device 2 by reading out a predetermined program stored in the storage unit 22. Although it is shown as a single control unit 23 in FIG. 1, it is not limited to this, and it may be implemented so as to have a plurality of control units 23 (dedicated chips, etc.) for each function. Moreover, combinations thereof may be used.

Figure 2:
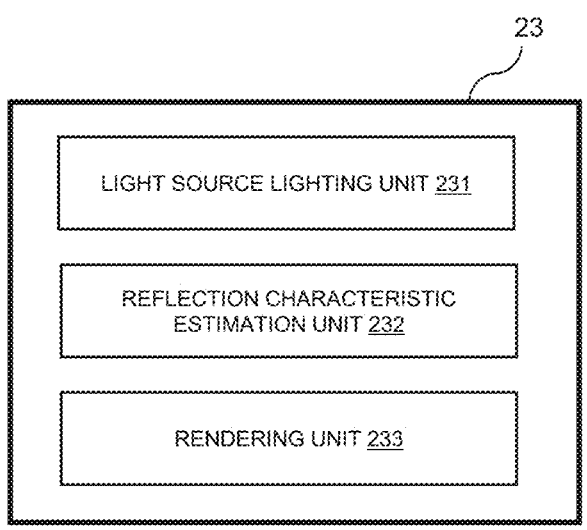
FIG. 2 is a functional block diagram of a control unit in the measurement device according to the present embodiment.

FIG. 2 is a functional block diagram showing the functions related to the control unit 23. The control unit 23 includes a light source lighting unit 231, a reflection characteristic estimation unit 232, and a rendering unit 233. The light source lighting unit 231 lights up the light source 24 as necessary in measuring the reflection characteristic. The reflection characteristic estimation unit 232 measures the reflection characteristic of the measurement point Sp based on the target information which is the sampling data and the instruction information stored in the storage unit 22. More specifically, the reflection characteristic estimation unit 232 measures the reflection characteristic by machine learning with a neural network. The machine learning inputs the target information, this machine learning inputs the target information, uses the instruction information as an instruction data, and outputs the reflection characteristic (see Section 3). Then, the reflection characteristic of the object S is estimated by preparing a plurality of such target information. The rendering unit 233 can generate the computer graphics by implementing the rendering of the computer graphics of the object S having the reflection characteristic.

<Light Source 24>

The light source 24 is configured to irradiate the incident light L_i to the measurement point Sp which is a part of the object S. The incident light L_i is preferably general diffuse white light (having at least an RGB component). The light source 24 is lighted on via a lighting circuit (not shown) based on the lighting command signal by the light source lighting unit 231 described above. Further, the numerical value relating to the incident light, which is one parameter of the target information, is not particularly limited, and the numerical value stored in the storage unit 22 in advance may be adopted.

<Light Detection Unit 25>

The light detection unit 25 is an element that detects light and converts the light into an electric signal, and includes, for example, a photodiode, a photomultiplier tube, a photoconductive element, a CCD, a camera, and the like. Here, the light detection unit 25 is configured to detect the reflected light L_o reflected by the incident light L_i irradiating the measurement point Sp which is a part of the object S. The detected reflected light L_o is converted into an electric signal and stored in the storage unit 22 as one parameter of the target information, that is, information of numerical values related to the reflected light.

<Display Unit 26>

The display unit 26 is a display that presents information by stimulating the vision of a user. Of course, in addition to the display unit 26, information presentation related to other sensations such as a speaker (not shown) and a vibrator (not shown) may be added in combination. More specifically, for example, it may be emphasized in a multi-modal or cross-modal manner depending on the application. With such a configuration, it is possible to extend to an "integrated texture presentation system" that virtually presents the texture of the object S to the observer. In particular, the display unit 26 can display the reflection characteristic measured by the control unit 23 based on the target information and the instruction information. More specifically, the computer graphics of the object S having the reflection characteristic can be displayed. Further, printing on various objects, color projection, projection mapping, and the like may be performed regarding such computer graphics.

1.2 Information Processing Device 3

As shown in FIG. 1, the information processing device 3 is a so-called workstation, and includes a storage unit 31 and a control unit 32. Of course, wired communication means such as USB, IEEE1394, Thunderbolt, wired LAN network communication, or wireless communication means such as wireless LAN network communication, mobile communication such as LTE/3G, Bluetooth (registered trademark) communication are included as needed. Via such a communication means, it is possible to communicate with the measurement device 2 via such a communication means. Hereinafter, each component related to the information processing device 3 will be further described.

<Storage Unit 31>

The storage unit 31 (an example of a "storage medium" in the claims) stores the instruction information described in Section 1.1 and various programs for the control unit 32 to execute, and the like. This can be implemented, for example, as a storage device such as a solid state drive (SSD), or as a random access memory (RAM) that stores temporarily necessary information (arguments, arrays, etc.) related to program operations, and combinations thereof are preferable.

Although not particularly limited, the instruction information stored in the storage unit 31 may be configured to added data. As a result, the measurement device 2 connected to the information processing device 3 via the network can acquire the latest teacher information having a richer amount of information. That is, it is expected that the accuracy of the reflection characteristic measured by the control unit 23 in the measurement device 2 will be improved.

<Control Unit 32>

The control unit 32 processes and controls the entire operation related to the information processing device 3. The control unit 32 is, for example, a central processing unit (CPU) (not shown). The control unit 32 realizes various functions related to the information processing device 3 by reading out a predetermined program stored in the storage unit 31. In this embodiment, the details of these functions will be omitted.

2. Reflection Characteristic

In Section 2, one example of the reflection characteristic measured by the measurement system 1 according to the present embodiment will be described in detail.

In the first place, as a function expressing the reflection characteristic, there is an outgoing bidirectional scattering surface reflectance distribution function (BSSRDF), which is specifically expressed as [Equation 1].

$$f_{BSSRDF}(x_o, \omega_o, x_i, \omega_i) = \frac{dL_o(x_o, \omega_o)}{dE_i(x_i, \omega_i)} \qquad \text{[Equation 1]}$$

Here, E_i, x_i, and ω_i (φ_i and θ_i) are an irradiance, an incident position, and an incident direction of the incident light L_i, respectively. Further, L_o, x_o, and ω_o (φ_o and θ_o) are a radiance, a reflection position, and a reflection direction of the reflected light L_o. Among the BSSRDFs, those that do not depend on the incident position and the reflection position are particularly called a bidirectional reflectance distribution function (BRDF) and are represented as [Equation 2].

$$f_{BRDF}(\omega_o, \omega_i) = \frac{dL_o(\omega_o)}{dE_i(\omega_i)} \qquad \text{[Equation 2]}$$

As a method of adopting the coordinate system of BRDF, in addition to the coordinate system based on the directions of the incident light L_i and the reflected light L_o as described above, the Rusinkiewicz coordinate system defined based on the half vector is known. The half vector ω_h is represented as [Equation 3].

$$\omega_h = \frac{\omega_i + \omega_o}{\|\omega_i + \omega_o\|} \qquad \text{[Equation 3]}$$

Figure 3A:
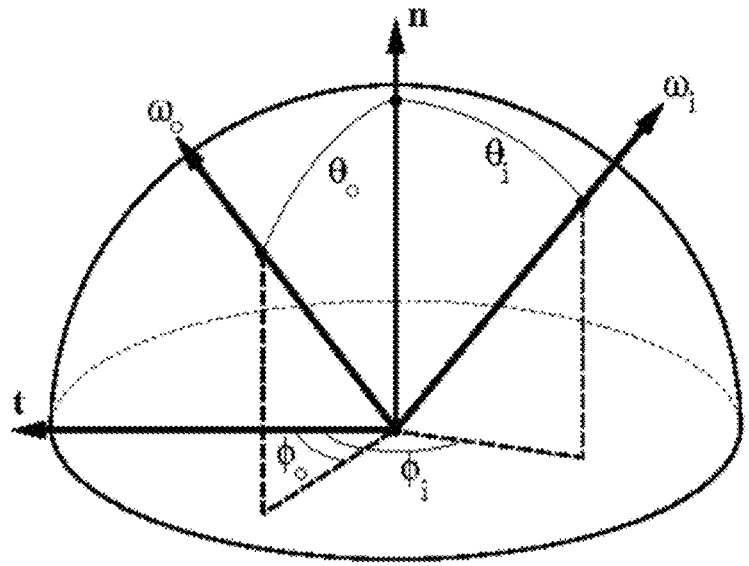
FIGS. 3A and 3B are diagrams showing a Rusinkiewicz coordinate system.
Figure 3B:
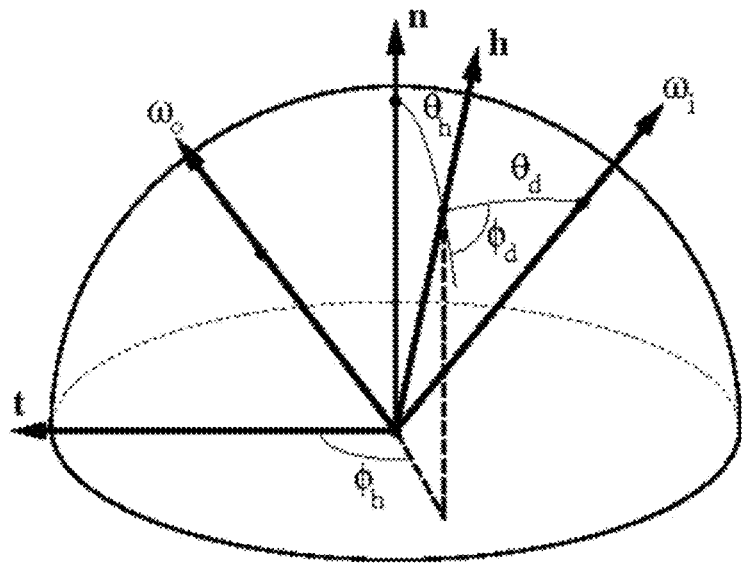

Assuming isotropic property, that is, the property that the reflection characteristic is invariant with respect to rotation about the normal line n, the degree of freedom of ω_h is 1, and it becomes a three-variable function with θ_h, θ_d, and φ_d as variables as shown in [Equation 4]. However, as shown in FIGS. 3A and 3B, each variable shall be defined by the Rusinkiewicz coordinate system.

$$f_{BRDF}(\theta_h, \theta_d, \varphi_d) \qquad \text{[Equation 4]}$$

Although anisotropic reflection is found in materials such as hairline-processed metals, gems, and woven fabrics, here, isotropic is assumed for simplicity. That is, in the present embodiment, the object S is assumed to be a material in which the influence of subsurface scattering can be ignored and isotropic is established, that is, a material whose reflection characteristic is represented by an isotropic BRDF. Further, the function shown in [Equation 4] can be simply described as f (θ_h, θ_d, φ_d). It should be noted that this is merely an example in the present embodiment, and the present invention is not limited to this.

3. Machine Learning Using Neural Network

In Section 3, a machine learning using neural network (an example of "second machine learning" in the claims) will be described in detail. In the measurement of the reflection characteristic according to the present embodiment, an approach of reducing the number of samplings (an example of the "number of combinations" in the claims) is adopted in order to enable high-speed measurement of the reflection characteristic. This is called the minimum sampling method. Further, in order to achieve high speed, the sampling direction is not determined adaptively, but a predetermined direction is used. Therefore, it is advantageous in that it is unnecessary to have a movable portion in the configuration of the measurement device 2.

When the minimum sampling is adopted, since it is necessary to estimate the data in the direction not sampled, the improvement of the accuracy is an issue. In the present embodiment, a neural network is used to provide an estimator (reflection characteristic estimation unit 232) that inputs sampling data and outputs reflection characteristic. By designing the estimator in this way, since model generation and model parameter estimation are optimized at the same time, the performance is expected to improve.

Further, since the reflection characteristic model specialized for the sampling direction is learned, there is no strong and weak sampling direction derived from the reflection characteristic model, and an estimator can be freely constructed with respect to the sampling direction. Therefore, it is considered that the function of the existing gloss meter can be expanded to provide a more compact measurement device 2. In Section 6, it will be described in detail.

Here, in order to improve the estimation accuracy, the reflection characteristic estimation unit 232 introduces a conversion called cos-mapping as represented by [Equation 5].

$$(\theta_h, \theta_d, \phi_d) \rightarrow (\sin \theta_h, \cos \theta_d, \cos 2\phi_d) \quad \text{[Equation 5]}$$

The conversion of φ_d→cos 2φ_d is a conversion for satisfying the reciprocity of Helmholtz. Further, θ_h→sin θ_h and θ_d→cos θ_d are transformations that allow a more detailed look at the specular reflection near θ_h=0 and the Fresnel reflection near θ_d=π/2. It is considered that such a transformation can improve the accuracy of machine learning by the neural network.

Figure 4:
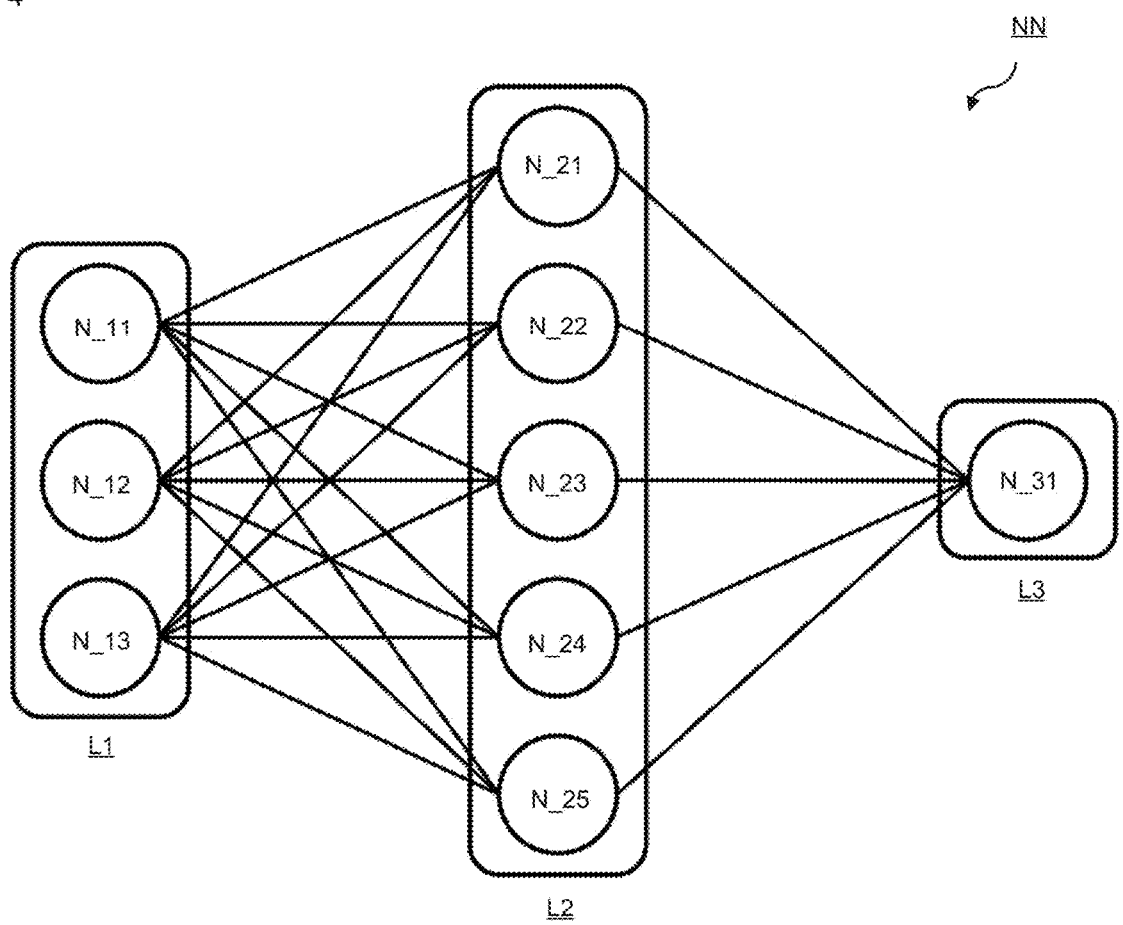
FIG. 4 is a schematic diagram showing a neural network.

FIG. 4 is a schematic diagram of the neural network NN. Input signals defined by various parameters are input to the first layer L1. Here, the input signal is target information including a sampling direction (an example of "coordinate positional relationship" in the claims) and a sampling value (an example of "numerical values relating to incident light and reflected light" in the claims). Such an input signal is output from the calculation nodes N_11 to N_13 of the first layer L1 to the calculation nodes N_21 to N_25 of the second layer L2, respectively. At this time, the value obtained by multiplying the value output from the calculation nodes N_11 to N_13 by the weight w set between the calculation nodes N is input to the calculation nodes N_21 to N_25.

The calculation nodes N_21 to N_25 add the input values from the calculation nodes N_11 to N_13, and input such a value (or a value obtained by adding a predetermined bias value) to a predetermined activation function. As the activation function, for example, the one represented by [Equation 6] is used.

$$\text{Swish}(x) = x \cdot \text{sigmoid}(x) = \frac{x}{1+e^{-x}} \quad \text{[Equation 6]}$$

Then, the output value of the activation function is propagated to the calculation node N_31, which is the next node. At this time, a value obtained by multiplying the weight w set between the calculation nodes N_21 to N_25 and the calculation node N_31 by the output value is input to the calculation node N_31. The calculation node N_31 adds the input values and outputs the total value as an output signal. At this time, the calculation node N_31 may add the input values, input the value obtained by adding the bias value to the total value to the activation function, and output the output value as an output signal. As a result, the estimated BRDF is output.

It should be noted that what is shown in FIG. 4 is for illustration purposes only, and is not limited thereto. For example, in the present embodiment, it is conceivable to adopt one having two intermediate layers. The number of nodes in the middle layer is an adjustable parameter, for example, (64,2048), (128,1024), (256,512), (512,256), (1024,128), (2048,64), or the like, preferably (128,1024), (512,256), and more preferably (128,1024). Further, the instruction information which is the measurement result of the known reflection characteristic is preferable to adopt the information contained in an appropriate database that collects the isotropic BRDF.

4. Measurement

Figure 5:
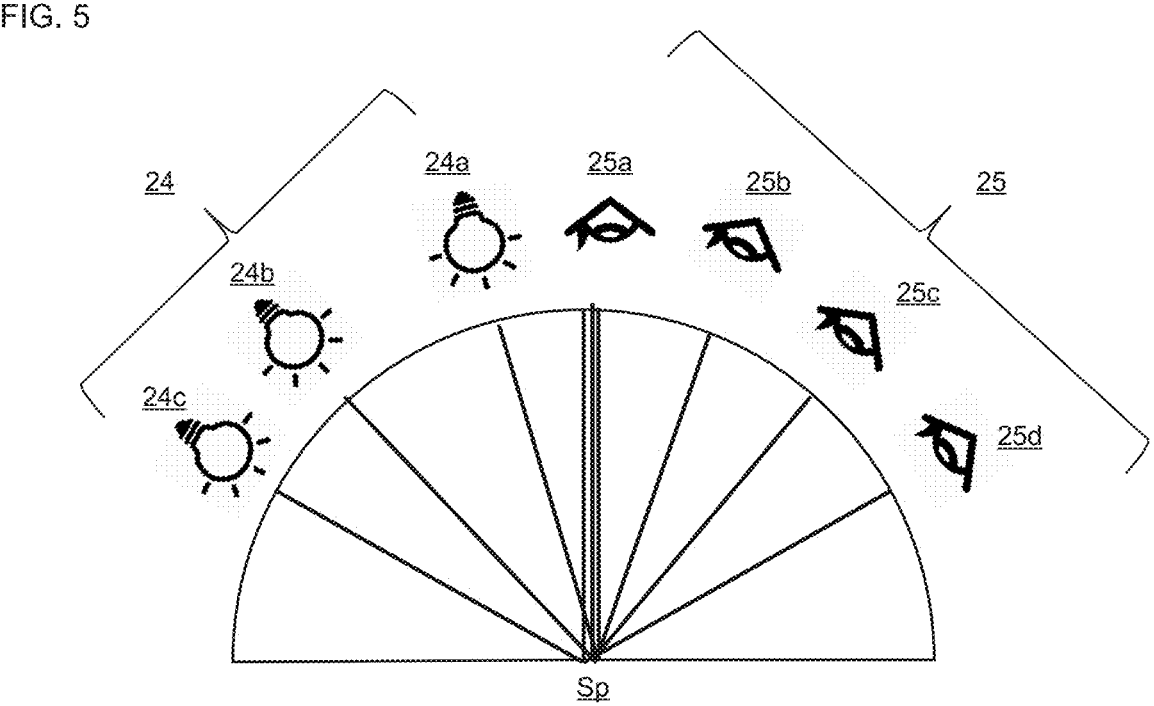
FIG. 5 is a diagram showing an example in which the number of samplings is 6.

By using the measurement system 1 as described above, it is possible to reduce the number of samplings and measure the BRDF, that is, the reflection characteristic, at higher speed and higher accuracy than before. The number of such samplings is, for example, 1 to 15, preferably 2 to 10, and more preferably 3 to 6. Specifically, for example, it is 1, 2, 3, 4, 5, 6, 7, 8, 9, 10, 11, 12, 13, 14, 15, and it may be within the range between any two of the numerical values exemplified here. For example, as shown in FIG. 5, when the measurement is performed with the sampling number set to 6, the result as shown in FIG. 6A can be obtained. Note that FIG. 6B is a pre-measurement of the true value of the result. The sampling direction in such measurement was adopted as shown below. However, φ_j, θ_i, φ_o, and θ_o are shown in FIGS. 3A and 3B, and are frequency representations.

(Φ_i, θ_i, φ_o, θ_o)=(0,20,180,20), (0,45,180,45), (0,60, 180,60), (0,20,0,0), (0,45,0,0), (0,60,0,0)

Such a combination is based on a known industrial standard, in which the position of the light source 24 is different in three places and the position of the light detection unit 25 (that is, the detection position of the reflected light) is different in four places (Light sources 24a to 24c and light detection units 25a to 25d in FIG. 5, respectively). Of course, this is just an example and not limited to this. It is preferable that the light source 24 and the light detection unit 25 are separately prepared in order to eliminate the movable portion, but a movable portion may be provided so that one light source 24 and the light detection unit 25 can be reused. Comparing FIGS. 6A and 6B, there is no noticeable difference between the two, and the purpose of measuring the reflection characteristic at high speed and high accuracy is achieved.

Figure 7:
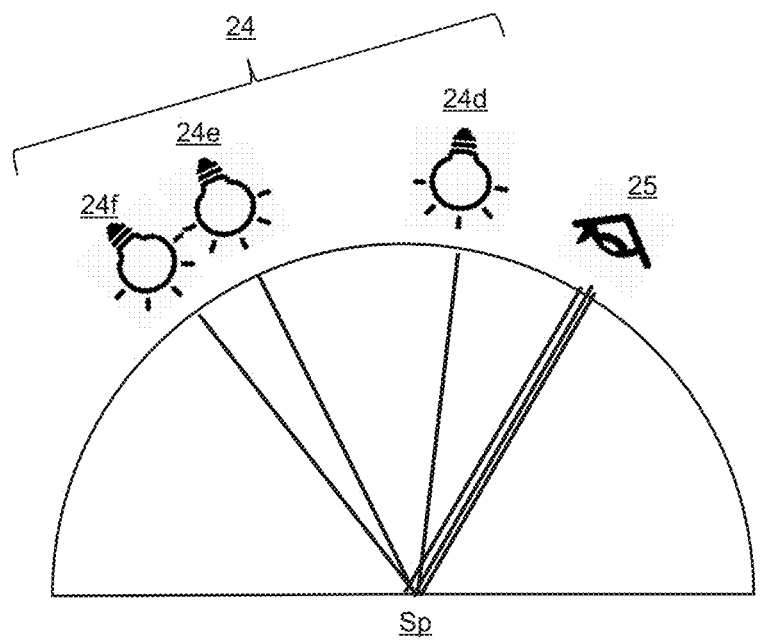
FIG. 7 is a diagram showing an example in which the number of samplings is 3.

Further, as shown in FIG. 7, when the measurement is performed with the sampling number set to 3, the result as shown in FIG. 8A can be obtained. Note that FIG. 8B is a pre-measurement of the true value of such result. The sampling direction in such measurement was adopted as shown below. However, φ_j, θ_i, φ_o, and θ_o are shown in FIGS. 3A and 3B, and are frequency representations.

(φ_i, θ_o, φ_o, θ_o)=(0,30,180,30), (0,26,180,30), (180, −10,180,30)

Such a combination is inspired and uniquely set based on the above-mentioned industrial standard, the position of the light source 24 is set to three different positions, and the position of the light detection unit 25 (that is, the detection position of the reflected light) is set to one position (light sources 24d to 24f and light detection unit 25 in FIG. 7, respectively). Of course, this is just an example and not limited to this. It is preferable that the light source 24 and the light detection unit 25 are separately prepared in order to eliminate the movable portion, but a movable portion may be provided so that one light source 24 and the light detection unit 25 can be reused. Comparing FIGS. 8A and 8B, there is no noticeable difference between the two, and the purpose of measuring the reflection characteristic at high speed and high accuracy is achieved.

5. Measurement Method Using Measurement Device 2

Figure 9:
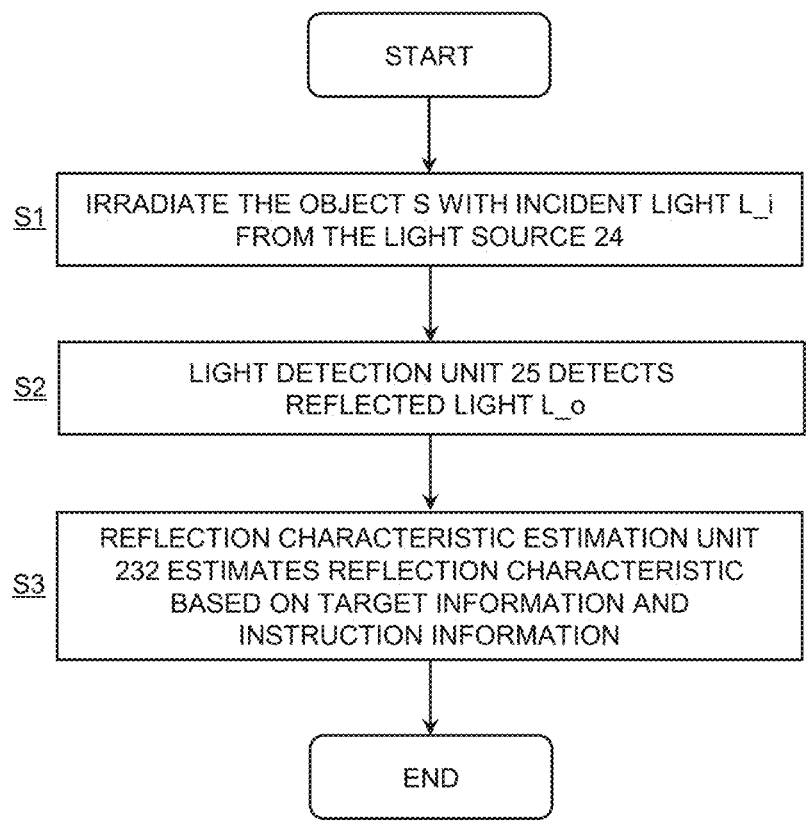
FIG. 9 is a flowchart showing a measurement method according to the present embodiment.

In Section 5, an example of a measurement method of the reflection characteristic of the object S using the measurement device 2 described above will be handled. FIG. 9 is a flowchart of the measurement method. Hereinafter, each step shown in FIG. 9 will be described.

[Start]

(Step S1)

In step S1 (an example of the "light irradiation step" in the claims), in the measurement device 2, the light source lighting unit 231 in the control unit 23 reads out a predetermined program stored in the storage unit 22. Then, the light source 24 is turned on with a specified intensity, whereby the incident light L_i is irradiated to the measurement point Sp in the object S. The coordinate position of the light source 24 and the specified intensity are stored in the storage unit 22.

(Step S2)

In step S2 (an example of the "light detection step" in the claims), the incident light L_i irradiated to the measurement point Sp in step S1 is reflected, and the light detection unit 25 detects the reflected light L_o as a predetermined intensity. The coordinate positions of the light detection unit 25 and the measurement point Sp, and the detected predetermined intensity are stored in the storage unit 22.

(Step S3)

In step S3 (an example of the "measurement step" in the claims), the reflection characteristic estimation unit 232 in the control unit 23 measures the reflection characteristic of the object S based on the information stored in the storage unit 23 (see the steps S1 and S2), that is, the target information, and the instruction information previously stored in the storage unit 23. More specifically, the reflection characteristic is estimated by machine learning by a neural network. At this time, the number of combinations of coordinate positional relationships included in the target information is smaller than that of the conventional measurement method of reflection characteristic, and is set in a range of, for example, 1 to 15 or smaller.

[End]

6. Modifications

The present embodiment may be further creatively devised according to the following aspects.

First, the reflection characteristic obtained from the measurement result may be applied to, for example, an object different from the object S. In other words, the control unit 32 in the information processing device 3 executes the rendering of the computer graphics of the different object so as to have the reflection characteristic of the object S. That is, applications such as applying the reflection characteristic previously measured to a desired target can be expected in fields such as video content production. In Section 7, it will be described in more details by using existing gloss meters and color meters as examples.

Second, the function related to the control unit 23 (more specifically, the reflection characteristic estimation unit 232 and the rendering unit 233) in the measurement device 2 may be performed so as to have the control unit 32 in the information processing device 3. That is, the target information is transmitted from the communication unit 21 in the measurement device 2 to the information processing device 3 via the network, and the control unit 32 in the information processing device 3 may be carried out to measure the reflection characteristic based on such target information and instruction information stored in the storage unit 31.

Third, the target information previously acquired may be read into the measurement device 2 after the fact, and the reflection characteristic of the object S may be measured. In such a case, the target information may be transmitted to the measurement device 2 via the communication unit 21 described in Section 1, or may be read into via a so-called flash memory (for example, SD memory card, USB memory, memory stick, smart media, compact flash, or the like). Further, the target information may read into the parameters included in the target information, or may read into data (for example, an image file or the like) that indirectly includes these parameters. Of course, it should be noted that the light source 24 and the light detection unit 25 are not essential configurations in the measurement device 2 in such cases.

7. Embodiment Using Gloss Meter/Color Meter

In the present section, an example in which a gloss meter or a color meter is used as the measurement device 2 will be described in detail.

7.1 Estimation of Monochrome BRDF by A Gloss Meter

The measurement device 2 (gloss meter) measures the "glossiness" of the object S. Then, it is carried out so as to convert this into "BRDF" which is a reflection characteristic. According to the JIS standard, on a glass surface having a refractive index of 1.567, it is stipulated that a reflectance of 10% is defined as 100% glossiness at an incident angle of 60 degrees, and a reflectance of 5% is defined as 100% glossiness at an incident angle of 20 degrees. That is, it should be noted that glossiness is a physical quantity that depends on reflectance. Therefore, the BRDF, which is a reflection characteristic, can be theoretically calculated from the glossiness in a linear relationship related to the known object S.

Figure 10A:
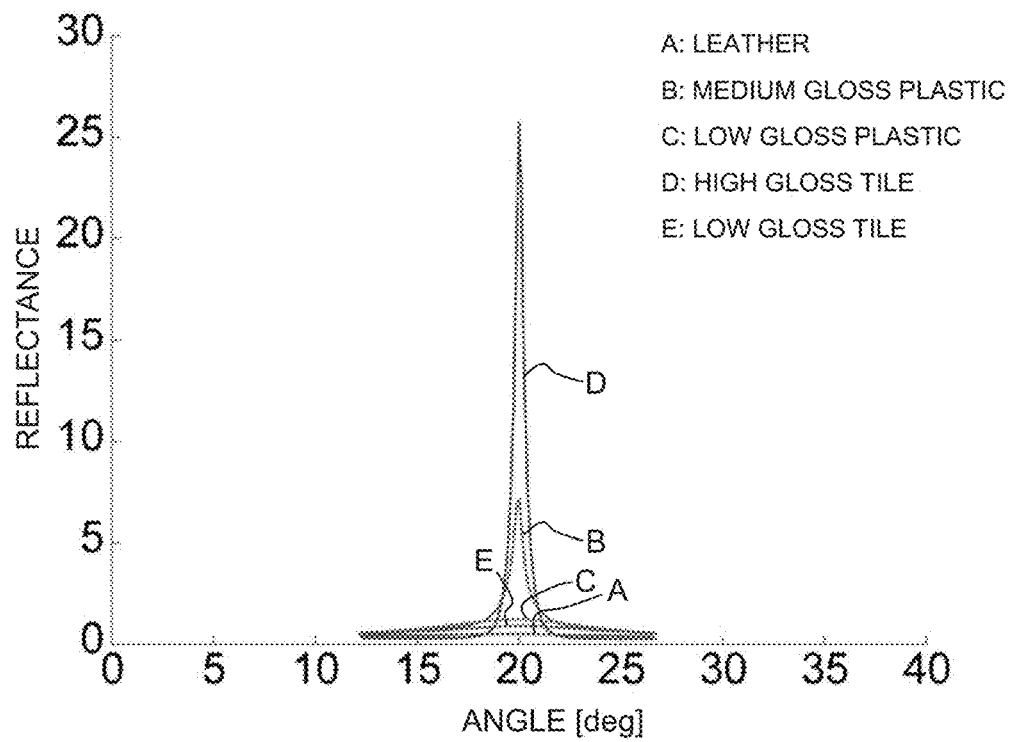
FIG. 10A is a diagram showing a distribution of reflectance of an object, that is, a distribution of glossiness (equivalent to reflectance)
Figure 10B:
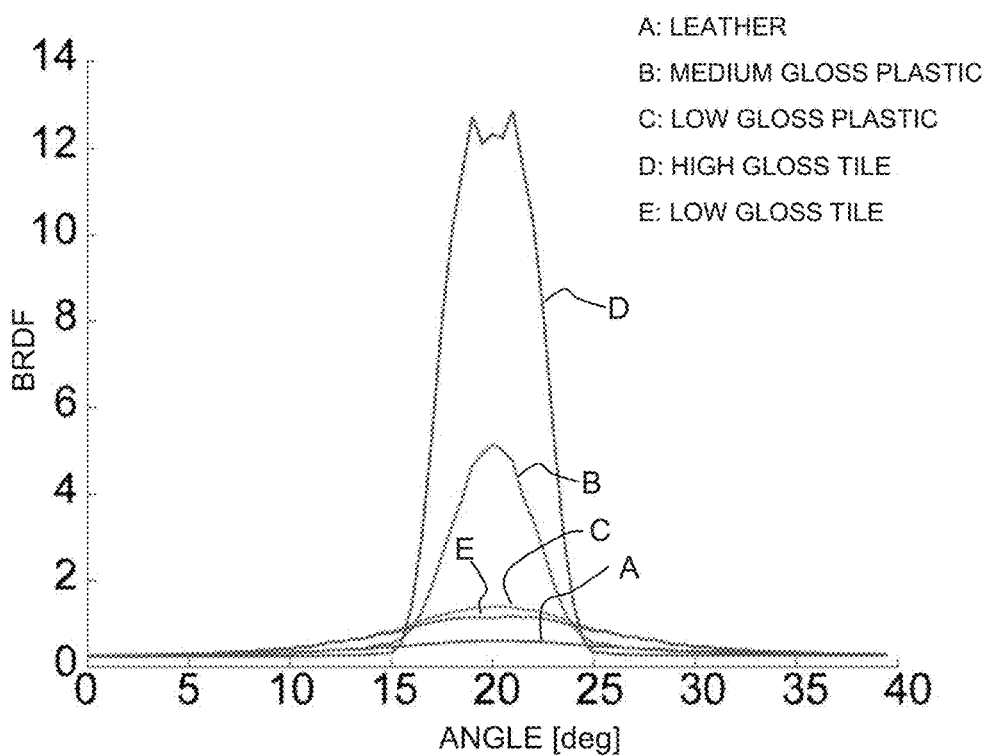
FIG. 10B is a diagram showing a distribution of BRDF of the object.

The graphs of FIGS. 10A and 10B show the distribution of the glossiness of the object S (as described above, since the glossiness is a physical quantity depending on the reflectance, the vertical axis in FIG. 10A is equivalent to the glossiness, that is, it may be replaced with the glossiness) and the BRDF measured by the measurement device 2 (gloss meter). Here, the distribution of the reflected light L_o for each reflection angle (light-receiving angle dependence of reflection angle) when the incident light L_i is incident at 20 degrees is shown. Further, A to E of each graph relate to the cases where the object S is a leather A, a medium gloss plastic B, a low gloss plastic C, a high gloss tile D, and a low gloss tile E, respectively. Based on such results, it is confirmed that the spread of the BRDF distribution is wider than the spread of the glossiness distribution that can be measured by the gloss meter. It is presumed that this is because the light detection unit 25 in the measurement device 2 (gloss meter) and the sensor (not shown) that measures the reflection characteristic (BRDF) as instruction information are different. Therefore, by using a machine learning (an example of "first machine learning" in the claims) led by a support vector machine (SVM), the conversion of the BRDF (an example of "partial reflection characteristic" in the claims) is learned from the glossiness, and based on this, the distribution of the BRDF is devised so as to obtain the BRDF distribution. Especially considering the spread of the distribution, it is preferable to, for instance, generate a machine learning model that can estimate the BRDF values of the horizontal axes 5 to 35 degrees in FIG. 10B from the distribution of the glossiness of the horizontal axis 15 to 25 degrees in FIG. 10A.

That is, by combining a conversion that inputs glossiness and outputs BRDF (explained as described above in this section) and a conversion that inputs the BRDF and outputs BRDF (Full BRDF) of the entire object S (explained as a superordinate concept as "reflection characteristic" in Sections 1 to 5), the glossiness can be measured and the Full BRDF can be obtained therefrom. This can be applied to the rendering of computer graphics of different objects so as to have the BRDF of the object S described as a modification.

FIGS. 11A to 11C show an example in which the glossiness of the object S is measured to estimate the Full BRDF is estimated, and this is output as computer graphics (Stanford bunny) of a different object. Since the gloss meter cannot obtain color information, experiments were carried out with various achromatic colors. In any case, the Full BRDF can be estimated from the glossiness of the object S, and it can be output as a Stanford bunny applied to the computer graphics.

7.2 Restoration of Color Information Using a Color Meter

In FIG. 10A, for example, referring to the vicinity of 20 degrees on the horizontal axis, since normal reflection (specular reflection) is naturally performed, each of the objects S by the materials A to E has a reflection peak at each. On the other hand, referring to the vicinity of 15 degrees, it is confirmed that the glossiness of each of the objects S made of the materials A to E has dropped to a value close to 0. That is, in the region of 15 degrees (diffuse reflection component), almost no gloss is seen as in the region of 20 degrees (specular reflection component), but it is considered that humans perceive it as a color instead. Therefore, as described above, if a machine learning model that can estimate the BRDF value of the horizontal axis of 5 to 35 degrees in FIG. 10B from the distribution of the glossiness of the horizontal axis of 15 to 25 degrees in FIG. 10A is generated, it is suggested that color information can also be restored when computer graphics are generated.

Therefore, the experiment was conducted again by using the measurement device 2 as a gloss meter and a color meter. The result is shown in FIG. 12. By measuring the object S with the measurement device 2 (gloss meter), the glossiness is measured, and the Stanford bunny that restores the reflection characteristic in monochrome using the Full BRDF estimated based on this is output. From here, the diffuse reflection component is extracted, and by applying the color measured separately by the measurement device 2 (color meter) to such diffuse reflection component using an existing algorithm related to computer graphics, the Stanford bunny is output including the color information of the object S.

7.3 Summary

By combining the existing gloss meter and the color meter as the measurement device 2 in this way, it is possible to perform rendering of computer graphics of different objects so as to have the reflection characteristic of the object S. It should be noted that this is just an experiment, and it is more preferable to newly implement a measurement device 2 capable of measuring both glossiness and color.

That is, the following matters should be noted. The control unit 23 is configured to measure the reflection characteristic based on the glossiness of the object S. The control unit 23 estimates the partial reflection characteristic, which is a part of the reflection characteristic, by the first machine learning with the glossiness as an input, and estimates the reflection characteristic by the second machine learning with the partial reflection characteristic as an input. Such reflection characteristic includes a specular reflection (for example, normal reflection) component representing gloss and a diffuse reflection component associated with color information.

8. Conclusion

As described above, according to the present embodiment, it is possible to implement the measurement device 2 capable of measuring the reflection characteristic of a desired object at higher speed and higher accuracy than before.

Such measurement device 2 comprises a control unit 23 configured to measure a reflection characteristic of an object S based on target information and instruction information, wherein: the target information is information including a coordinate positional relationship among a light source position of an incident light L_i, a light detection position of a reflected light L_o and a measurement point Sp at the object S, and numerical values related to the incident light L_i and the reflected light L_o, the incident light L_i is light irradiated to the measurement point Sp, the reflected light L_o is light that the incident light L_i is irradiated to the measurement point Sp and then reflected at the measurement point Sp, the instruction information is information related to an existing measurement result of the reflection characteristic, and the number of combinations of the coordinate positional relationship included in the target information is 1 to 15.

Further, it is also possible to implement the measurement system 1 capable of measuring the reflection characteristic of a desired object at higher speed than before.

Such measurement system 1 comprises a measurement device 2 including a light source 24 irradiates an incident light L_i to a measurement point Sp at the object S, and a light detection unit 25 configured to detect the reflected light L_o that the incident light L_i is irradiated to the measurement point Sp and then reflected at the measurement point Sp; and an information processing device 3, wherein: at least one of the measurement device 2 and the information processing device 3 further comprises a control unit 23/32, the control unit 23/32 is configured to measure a reflection characteristic of the object S based on target information and instruction information, the target information is information including a coordinate positional relationship among the light source 24, the light detection unit 25, and the measurement point Sp, and numerical values related to the incident light L_i and the reflected light L_o, the instruction information is information related to an existing measurement result of the reflection characteristic, and the number of combinations of the coordinate positional relationship included in the target information is 1 to 15, and the measurement device 2 and the information processing device 3 are configured to transmit and receive at least one of the target information, the instruction information, and information including the reflection characteristic to and from each other via a network.

Then, software for implementing the measurement device 2 that can measure the reflection characteristic of the desired object at higher speed than the conventional one as hardware can also be implemented as a program. Then, such a program may be provided as a non-transitory computer readable medium that can be read by a computer, or may be provided for download from an external server, or may be started by an external computer to perform so-called cloud computing in which each function can be executed on a client terminal.

Such measurement program is for allowing a computer to perform a predetermined function, wherein: the predetermined function includes a measurement function, a reflection characteristic of an object S is measured based on target information and instruction information by the measurement function, the target information is information including a coordinate positional relationship among a light source position of an incident light L_i, a light detection position of a reflected light L_o and a measurement points Sp at the object S, and numerical values related to the incident light L_i and the reflected light L_o, the incident light L_i is light irradiated to the measurement point Sp, the reflected light L_o is light that the incident light L_i is irradiated to the measurement point Sp and then reflected at the measurement point Sp, the instruction information is information related to an existing measurement result of the reflection characteristic, and the number of combinations of the coordinate positional relationship included in the target information is 1 to 15.

Further, by using the measurement device 2 and the measurement system 1, it is possible to carry out a measurement method capable of measuring the reflection characteristic of a desired object at higher speed and a higher accuracy than before.

Such measurement method comprises a light irradiation step S1 irradiates an incident light L_i to a measurement point at an object S; a light detection step S2 detects a reflected light L_o that the incident light L_i is irradiated to the measurement point Sp and then reflected at the measurement point Sp; and a measurement step S3 measures a reflection characteristic of the object S based on a coordinate positional relationship among a light source position of the incident light L_i, a detection position of the reflected light L_o and the measurement point Sp, numerical values related to the incident light L_i and the reflected light L_o, and an existing measurement result of the reflection characteristic, wherein: the number of combinations of the coordinate positional relationship is 1 to 15.

Finally, various embodiments of the present invention have been described, but these are presented as examples and are not intended to limit the scope of the invention. The novel embodiment can be implemented in various other forms, and various omissions, replacements, and changes can be made without departing from the abstract of the invention. The embodiment and its modifications are included in the scope and abstract of the invention and are included in the scope of the invention described in the claims and the equivalent scope thereof.

The invention claimed is:

1. A reflection characteristic measurement device, comprising:
  a memory configured to store a program; and
  a processor configured to execute the program so as to:
    presumptively measure a reflection characteristic of an object by inputting target information into a learned model that has been formed via machine learning in advance, wherein
    the target information includes a coordinate positional relationship among a light source position of an incident light, a light detection position of a reflected light, and a measurement point at the object, and the target information includes numerical values related to the incident light and the reflected light,
    the incident light is light that is irradiated to the measurement point, and the reflected light is light that is formed by irradiating the incident light to the measurement point and then being reflected at the measurement point,
    the learned model has been formed by learning a relationship between the target information in an existing measurement and the reflection characteristic that is measured using at least the target information as a sample, and
    a number of combinations of the coordinate positional relationship included in the target information is 1 to 15.

2. The measurement device according to claim 1, further comprising:
  a light source configured to irradiate the incident light; and
  a light detector configured to detect the reflected light.

3. The measurement device according to claim 1, wherein
  the processor is further configured to output at least one of the target information, information relating to the learned model, and information relating to the reflection characteristic to an external apparatus.

4. The measurement device according to claim 1, wherein:
  the processor is further configured to generate a computer graphics based on the reflection characteristic.

5. The measurement-system, device according to claim 4, wherein
  the processor is further configured to apply the reflection characteristic to another object different from the object and to generate the computer graphics of the object.

6. The measurement device according to claim 1, wherein the number of combinations is 2 to 10.

7. The measurement device according to claim 1, wherein the number of combinations is 3 to 6.

8. The measurement device according to claim 7, claim 1, wherein
  the reflection characteristic is expressed as a function f ($\theta\_h$, $\theta\_d$, $\varphi\_d$) having $\theta\_h$, $\theta\_d$, and $\varphi\_d$ that are angle variables representing BRDF in the Rusinkiewicz coordinate system, and
  the machine learning includes processes of converting $\varphi\_d$ to $\cos 2\varphi\_d$, $\theta\_h$ to $\sin \theta\_h$, and $\theta\_d$ to $\cos \theta\_d$.

9. The measurement device according to claim 1, wherein
  the processor is configured to measure the reflection characteristic based on a glossiness of the object.

10. The measurement device according to claim 9, wherein
  the machine learning includes first machine learning and second machine learning, and
  the processor is further configured to:
    estimate a partial reflection characteristic that is a part of the reflection characteristic by the first machine learning using the glossiness as an input; and
    estimate the reflection characteristic by the second machine learning using the partial reflection characteristic as an input.

11. The measurement device according to claim 1, wherein the reflection characteristic includes a specular reflection component representing gloss and a diffuse reflection component associated with color information.

12. A non-transitory computer readable media storing a measurement program for causing a computer to execute a process by a processor so as to perform the steps of:
  measuring a reflection characteristic of an object by inputting target information into a learned model that has been formed via machine learning in advance, wherein
  the target information includes a coordinate positional relationship among a light source position of an incident light, a light detection position of a reflected light, and a measurement point at the object, and the target information includes numerical values related to the incident light and the reflected light,
  the incident light is light that is irradiated to the measurement point, and the reflected light is light that is formed by irradiating the incident light to the measurement point and then being reflected at the measurement point,
  the learned model has been formed by learning a relationship between the target information in an existing measurement and the reflection characteristic that is measured using at least the target information as a sample, and
  the number of combinations of the coordinate positional relationship included in the target information is 1 to 15.

13. The non-transitory computer readable media according to claim 12, wherein
  the processor is further configured to output at least one of the target information, information relating to the learned model, and information relating to the reflection characteristic to an external apparatus.

14. The non-transitory computer readable media according to claim 12, wherein
  the processor is further configured to generate a computer graphics based on the reflection characteristic.

15. The non-transitory computer readable media according to claim 12, wherein
  the number of combinations is 2 to 10.

16. The non-transitory computer readable media according to claim 12, wherein
  the number of combinations is 3 to 6.

17. The non-transitory computer readable media according to claim 12, wherein
  the reflection characteristic is expressed as a function $f(\theta\_h, \theta\_d, \varphi\_d)$ having $\theta\_h$, $\theta\_d$, and $\varphi\_d$ that are angle variables representing BRDF in the Rusinkiewicz coordinate system, and
  the machine learning includes processes of converting $\varphi\_d$ to $\cos 2\varphi\_d$, $\theta\_h$ to $\sin \theta\_h$, and $\theta\_d$ to $\cos \theta\_d$.

18. The non-transitory computer readable media according to claim 12, wherein
  the processor is configured to measure the reflection characteristic based on a glossiness of the object.

19. The non-transitory computer readable media according to claim 18, wherein
  the machine learning includes first machine learning and second machine learning, and
  the processor is further configured to:
    estimate a partial reflection characteristic that is a part of the reflection characteristic by the first machine learning using the glossiness as an input; and
    estimate the reflection characteristic by the second machine learning using the partial reflection characteristic as an input.

20. The non-transitory computer readable media according to claim 12, wherein
  the reflection characteristic includes a specular reflection component representing gloss and a diffuse reflection component associated with color information.

\* \* \* \* \*